United States Patent
Shreve et al.

(10) Patent No.: US 9,802,571 B2
(45) Date of Patent: Oct. 31, 2017

(54) METHOD AND SYSTEM FOR VANDALISM AND/OR LOITERING DETECTION USING VIDEO

(71) Applicant: Conduent Business Services, LLC, Dallas, TX (US)

(72) Inventors: Matthew Adam Shreve, Webster, NY (US); Yao Rong Wang, Webster, NY (US); Robert P. Loce, Webster, NY (US); Michael R. Furst, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 420 days.

(21) Appl. No.: 14/503,957

(22) Filed: Oct. 1, 2014

(65) Prior Publication Data
US 2016/0096506 A1 Apr. 7, 2016

(51) Int. Cl.
*H04N 7/18* (2006.01)
*B60R 25/102* (2013.01)
*G06K 9/00* (2006.01)
*G08B 13/196* (2006.01)

(52) U.S. Cl.
CPC ........ *B60R 25/102* (2013.01); *G06K 9/00771* (2013.01); *G08B 13/19613* (2013.01)

(58) Field of Classification Search
CPC ........................ G08B 13/19682; G08B 13/183
USPC ..................................... 348/11–118, 148, 149
See application file for complete search history.

(56) References Cited

U.S. PATENT DOCUMENTS

| 6,002,326 | A  | 12/1999 | Turner |
| 6,150,927 | A  | 11/2000 | Nesbitt |
| 7,382,244 | B1 | 6/2008  | Donovan et al. |
| 7,397,358 | B2 | 7/2008  | Boothroyd |
| 7,617,412 | B2 | 11/2009 | Shelvik et al. |
| 7,737,837 | B2 | 6/2010  | Donovan et al. |
| 7,772,967 | B2 | 8/2010  | Tanaka et al. |
| 7,801,507 | B2 | 9/2010  | Benco et al. |
| 7,893,848 | B2 | 2/2011  | Chew |
| RE42,915  | E  | 11/2011 | Okada |
| 8,115,656 | B2 | 2/2012  | Bevacqua et al. |
| RE43,891  | E  | 1/2013  | Golden |
| 8,392,118 | B2 | 3/2013  | Korn et al. |
| 8,451,331 | B2 | 5/2013  | Hughes |
| 8,666,117 | B2 | 3/2014  | Bulan et al. |
| 8,682,036 | B2 | 3/2014  | Wang et al. |
| 8,737,690 | B2 | 5/2014  | Bulan et al. |

(Continued)

FOREIGN PATENT DOCUMENTS

| EP | 0 602 765 A2 | 6/1994 |
| EP | 0 602 765 A3 | 6/1994 |

OTHER PUBLICATIONS

U.S. Appl. No. 14/171,022, filed Feb. 3, 2014, Schweid et al.
(Continued)

*Primary Examiner* — Andy Rao
(74) *Attorney, Agent, or Firm* — Fay Sharpe LLP

(57) ABSTRACT

This disclosure provides a method and system to detect a predefined activity, e.g., vandalism, loitering, trespass, etc., associated with a parked vehicle. According to an exemplary embodiment, a method includes capturing video of a parking area and processing the video to detect vandalism and/or loitering with respect to a region of interest associated with the parked vehicle.

17 Claims, 12 Drawing Sheets

(56) References Cited

U.S. PATENT DOCUMENTS

| | | |
|---|---|---|
| 8,744,132 B2 | 6/2014 | Bulan et al. |
| 9,159,228 B2 | 10/2015 | Wang et al. |
| 9,367,966 B2 | 6/2016 | Fan et al. |
| 2002/0000921 A1* | 1/2002 | Hutchinson .......... G08B 13/183 340/942 |
| 2005/0083212 A1* | 4/2005 | Chew ....................... G08G 1/14 340/932.2 |
| 2005/0163212 A1* | 7/2005 | Henson .................. H04N 7/181 375/240.01 |
| 2005/0163345 A1* | 7/2005 | van den Bergen ............ G08B 13/19682 382/103 |
| 2009/0040307 A1 | 2/2009 | Rubin |
| 2009/0262189 A1 | 10/2009 | Marman |
| 2009/0309709 A1 | 12/2009 | Bevacqua et al. |
| 2013/0265419 A1 | 10/2013 | Bulan et al. |
| 2013/0265423 A1 | 10/2013 | Bernal et al. |
| 2013/0265426 A1 | 10/2013 | Fan et al. |
| 2017/0024619 A1* | 1/2017 | Wu .................... G06K 9/00812 |

OTHER PUBLICATIONS

U.S. Appl. No. 14/070,812, filed Nov. 4, 2013, Wang et al.
U.S. Appl. No. 13/944,177, filed Jul. 17, 2013, Wang et al.
U.S. Appl. No. 13/935,605, filed Jul. 5, 2013, Wang et al.
U.S. Appl. No. 13/922,091, filed Jun. 19, 2013, Bulan et al.
U.S. Appl. No. 13/920,361, filed Jun. 18, 2013, Wang.
U.S. Appl. No. 13/918,364, filed Jun. 14, 2013, Wang et al.
U.S. Appl. No. 13/913,606, filed Jun. 10, 2013, Wu et al.
U.S. Appl. No. 13/888,528, filed May 7, 2013, Zehler et al.
U.S. Appl. No. 13/861,553, filed Apr. 12, 2013, Bulan et al.
U.S. Appl. No. 13/836,310, filed Mar. 15, 2013, Wu et al.
U.S. Appl. No. 13/835,386, filed Mar. 15, 2013, Bulan et al.

* cited by examiner

METHOD AND SYSTEM FOR VANDALISM AND/OR LOITERING DETECTION USING VIDEO

CROSS REFERENCE TO RELATED PATENTS AND APPLICATIONS

U.S. patent application Ser. No. 13/944,177, filed Jul. 17, 2013, by Wang et al. and entitled "METHODS AND SYSTEMS FOR VEHICLE THEFT DETECTION AND PREVENTION USING A SMARTPHONE AND VIDEO-BASED PARKING TECHNOLOGY" is incorporated herein by reference in its entirety.

BACKGROUND

This disclosure relates to methods and systems to detect activity in a region associated with a parked vehicle. According to one specific exemplary embodiment, provided is a method and system for detecting vandalism and/or loitering, and subsequently communicating an alert to an owner of the parked vehicle if vandalism and/or loitering is detected.

The security of a parking location is often a concern of a driver of a vehicle. Vehicle theft or vandalism detection and prevention can currently be accomplished in a number of ways, as discussed below.

A security system installed in a vehicle. A vehicle security system for protecting a vehicle from theft while the vehicle is unattended in a parking position typically is installed by the vehicle manufacturer. The vehicle manufacturer's installed security system usually includes adding hardware or a software component to the vehicle. As the addition of a security system increases the cost of the vehicle, not every vehicle may be equipped with such a system. For examples of vehicle security systems incorporated to the design of a vehicle, see David G Sonders, Protect & Defend, Inc., "VEHICLE SECURITY SYSTEM INCLUDING AN ANTI-CARJACKING SYSTEM", European Patent Application No. EP0602765 A2, published Jun. 22, 1994; U.S. Pat. No. RE42,915 E, Nov. 15, 2011, by Okada, entitled "VEHICLE SECURITY CONTROL APPARATUS"; Benco et al., "INCREASED AUTOMOBILE SECURITY VIA USE OF WIRELESS NETWORK", U.S. Pat. No. 7,801,507, issued Sep. 21, 2010; and Masahiro Tanaka et al., "CRIME PREVENTION DEVICE FOR VEHICLE", U.S. Pat. No. 7,772,967, issued Aug. 10, 2010.

Another common approach of providing security for a vehicle is for the driver to park in a secured location or for the driver to ask someone to watch his/her vehicle. However, access to information that indicates which parking locations are relatively safe/secure compared to others is not always available. Therefore, finding a secure site is not always possible and finding someone to watch a parked vehicle is not necessarily cost effective based on location, time of day, and length of time parked.

This disclosure provides a video method and system to detect human activity in a region proximate a parked vehicle, without the use of a vehicle installed security system or a person in the proximate area of the parked vehicle.

INCORPORATION BY REFERENCE

European Patent Application No. EP0602765 A2, filed Apr. 7, 1993, published Jun. 22, 1994, by Sonders, Protect & Defend, Inc., entitled "VEHICLE SECURITY SYSTEM INCLUDING AN ANTI-CARJACKING SYSTEM";

U.S. Pat. No. RE42,915 E, reissued Nov. 15, 2011, by Okada, entitled "VEHICLE SECURITY CONTROL APPARATUS";

U.S. Pat. No. 7,801,507, issued Sep. 21, 2010, by Benco et al., entitled "INCREASED AUTOMOBILE SECURITY VIA USE OF WIRELESS NETWORK";

U.S. Pat. No. 7,772,967, issued Aug. 10, 2010, by Tanaka et al., entitled "CRIME PREVENTION DEVICE FOR VEHICLE";

U.S. Patent Publication No. 2013/0265426, published Oct. 10, 2013, by Fan et al., entitled "SMARTPHONE AUGMENTED VIDEO-BASED ON-STREET PARKING MANAGEMENT SYSTEM";

U.S. Patent Publication No. 2013/0265423, published Oct. 10, 2013, by Bernal et al., entitled "VIDEO-BASED DETECTOR AND NOTIFIER FOR SHORT-TERM PARKING VIOLATION ENFORCEMENT";

U.S. Patent Publication No. 2013/0265419, published Oct. 10, 2013, by Bulan et al., entitled "A SYSTEM AND METHOD FOR AVAILABLE PARKING SPACE ESTIMATION FOR MULTISPACE ON-STREET PARKING";

U.S. patent application Ser. No. 14/171,022, filed Feb. 3, 2014, by Schweid et al., entitled "VEHICLE DETECTION METHOD AND SYSTEM INCLUDING IRRELEVANT WINDOW ELIMINATION AND/OR WINDOW SCORE DEGRADATION";

U.S. patent application Ser. No. 14/070,812, filed Nov. 4, 2013, by Wang et al., entitled "METHOD FOR OBJECT SIZE CALIBRATION TO AID VEHICLE DETECTION FOR VIDEO-BASED ON-STREET PARKING TECHNOLOGY";

U.S. patent application Ser. No. 13/944,177, filed Jul. 17, 2013, by Wang et al., entitled "METHODS AND SYSTEMS FOR VEHICLE THEFT DETECTION AND PREVENTION USING A SMARTPHONE AND VIDEO-BASED PARKING TECHNOLOGY";

U.S. patent application Ser. No. 13/935,605, filed Jul. 5, 2013, by Wang et al., entitled "IMAGE ASSISTED PARKING SPACE AVAILABILITY SEARCHING AND RESERVATION METHOD AND SYSTEM";

U.S. patent application Ser. No. 13/922,091, filed Jun. 19, 2013, by Bulan et al., entitled "A METHOD FOR AVAILABLE PARKING DISTANCE ESTIMATION VIA VEHICLE SIDE DETECTION"

U.S. patent application Ser. No. 13/920,361, filed Jun. 18, 2013, by Yao Rong Wang, entitled "METHODS AND SYSTEMS FOR EFFICIENTLY MONITORING PARKING OCCUPANCY";

U.S. patent application Ser. No. 13/918,364, filed Jun. 14, 2013, by Wang et al., entitled "A SYSTEM FOR PARKING RESERVATION AND FINDING PARKING SPACE SUITABLE FOR USER'S VEHICLE SIZE";

U.S. patent application Ser. No. 13/913,606, filed Jun. 10, 2013, by Wu et al., entitled "PRECIPITATION REMOVAL FOR VISION-BASED PARKING MANAGEMENT SYSTEMS";

U.S. patent application Ser. No. 13/888,528, filed May 7, 2013, by Zehler et al., entitled "SYSTEM AND METHOD OF MAPPING MULTIPLE APPLICATIONS TO A SINGLE NFC TAG";

U.S. patent application Ser. No. 13/861,553, filed Apr. 12, 2013, by Bulan et al., entitled "WIRELESS PARKING REGISTER/PAYMENT AND VIOLATION NOTIFICATION METHOD AND SYSTEM";

U.S. patent application Ser. No. 13/836,310, filed Mar. 15, 2013, by Wu et al., entitled "AUTOMATED IN-FIELD HIERARCHICAL TRAINING OF VEHICLE DETECTOR FOR GENERAL DEPLOYMENT OF VEHICLE DETECTION CAMERAS";

U.S. patent application Ser. No. 13/835,386, filed Mar. 15, 2013, by Bulan et al., entitled "TWO-DIMENSIONAL AND THREE-DIMENSIONAL SLIDING WINDOW-BASED METHODS AND SYSTEMS FOR DETECTING VEHICLES", are incorporated herein by reference in their entirety.

BRIEF DESCRIPTION

In one embodiment of this disclosure, described is a computer-implemented method of detecting a predefined human activity in a region of interest (ROI) associated with a parked vehicle registered with a vehicle monitoring service, the method comprising: the vehicle monitoring service capturing a video stream of a parking area including the parked vehicle registered with the vehicle monitoring service; the vehicle monitoring service identifying the parked vehicle in the video stream; the vehicle monitoring service processing the video to detect the predefined human activity with respect to the region of interest (ROI) associated with the parked vehicle registered with the vehicle monitoring service, the predefined human activity including a person detected within the ROI and behaving in a predefined manner; and the vehicle monitoring service communicating an alert to a user associated with the parked vehicle if the predefined human activity is detected.

In another embodiment of this disclosure, described is a parked vehicle monitoring system for detecting a predefined human activity in a region of interest (ROI) associated with a parked vehicle registered with the vehicle monitoring system; one or more image capturing devices configured to capture a video stream of a parking area including the parked vehicle registered with the vehicle monitoring system; an image processing module configured to process the video to detect the predefined human activity with respect to the ROI associated with the parked vehicle registered with the vehicle monitoring system, the predefined human activity including a person detected within the ROI and behaving in a predetermined manner; and a communications module configured to communicate an alert to a user associated with the parked vehicle.

In still another embodiment of this disclosure, described is a computer-implemented method of detecting one or more of vandalism and loitering activity in a region of interest (ROI) associated with a parked vehicle registered with a vehicle monitoring service, the method comprising: the vehicle monitoring service capturing a video stream of a parking area including the parked vehicle registered with the vehicle monitoring service; the vehicle monitoring service identifying the parked vehicle in the video stream; the vehicle monitoring service processing the video to detect one or more of vandalism and loitering with respect to the ROI associated with the parked vehicle registered with the vehicle monitoring service; and the vehicle monitoring service communicating an alert to a user associated with the parked vehicle if one or more of vandalism and loitering is detected.

DETAILED DESCRIPTION

Figure 1:
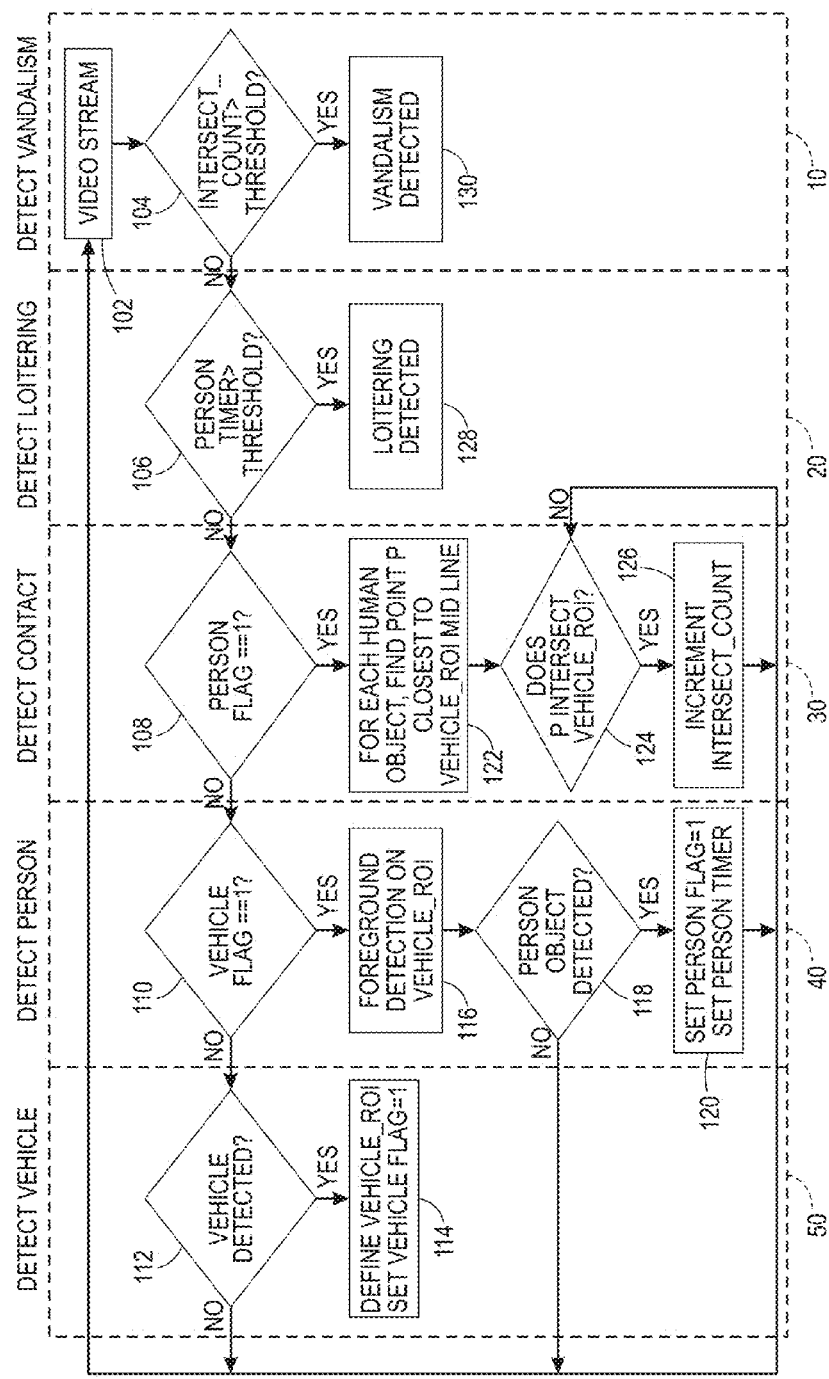
FIG. 1 is a flow chart of a method of detecting vandalism and/or loitering according to an exemplary embodiment of this disclosure.

This disclosure provides a video based method and system to detect one or more predefined human activities including, but not limited to, vandalism and loitering activities, such as vandalism and loitering associated with a vehicle parked on a street or in a parking lot. According to an exemplary embodiment, the method and system first detects if there is a vehicle parked in a pre-defined region of interest (ROI); if a vehicle is detected, then a human detection and tracking step is performed to find humans nearby and track their activity. The closest distance between each detected person and a mid-line of the vehicle of interest is calculated and evaluated to detect possible human-vehicle contact. Other distances that can be considered include the distance between the person and the centroid of the vehicle, percentage of overlap between the person and the vehicle and a distance from a detected person to a boundary of the vehicle. Depending on the applications, one or more of these distances may be used and/or combined to form a final distance measurement. The duration and location of the detected human-vehicle contact is used for vandalism and loitering detection and subsequently communication of an alert to an appropriate person if vandalism and/or loitering is detected.

Other methods and systems are also provided to detect vandalism as well as a type of vandalism. After detecting potential vandalism, a monitoring service subscriber, such as a vehicle owner or operator, is informed of the potential vandalism by transmitting the detected image or video clip through a wireless communication device such as a smartphone. Furthermore, this disclosure and the exemplary embodiments described herein can also be applied to any type of vehicles such as bikes, golf carts, ATVs, motorcycles, trucks, vans, or other items visible in the area of a video parking system.

This disclosure builds on video-based parking management technology and discloses a method and system for vehicle vandalism and/or loitering detection using elements of a parking management system. A vehicle monitoring service providing vandalism and/or loitering detection can be offered to any vehicle parked within an area monitored by the video-parking management system. Monitoring and detection of a wide variety of anomalous behavior can be achieved, and many options for preventive action can be pursued because of the availability of live video that can be machine or human monitored in contrast to a simple "beeping horn" in a vehicle-based system. Possible activation scenarios for triggering vandalism and/or loitering detection include 1) parking in a spot that provides the service, and 2) signing up or logging in to a mobile parking application through a smartphone or other platform prior to or after parking. See U.S. patent application Ser. No. 13/944,177, filed Jul. 17, 2013, by Wang et al., entitled "METHODS AND SYSTEMS FOR VEHICLE THEFT DETECTION AND PREVENTION USING A SMARTPHONE AND VIDEO-BASED PARKING TECHNOLOGY".

As previously described, the method and system disclosed herein detects/monitors predefined human activity including predefined behavior associated with a person near a vehicle.

It is to be understood that while the exemplary embodiments described herein focus on vandalism and/or loitering, other predefined human activity within proximity to a vehicle can be detected and monitored. Examples of other predefined human activity may include, but are not limited to: a person positioning themselves to look in a vehicle window; a person rapidly fleeing the location of a vehicle; and a person leaving an object near a vehicle.

According to the method and system disclosed herein, vandalism and/or loitering is detected by analyzing a video stream provided by a camera that includes a vehicle of interest.

FIG. 1 is a flow chart of a method of detecting vandalism and/or loitering according to an exemplary embodiment of this disclosure.

1) Acquire Video Stream 102. In this step, a video acquisition device, i.e., surveillance camera, is used to acquire video images including one or more parking spots. These images are then further processed for the possible detection of vandalism 10 and loitering 20, where Person Flag 108 and Vehicle Flag 110 are set to 0 if no vehicles are detected. A different instantiation of this example algorithm is started for each person detected in the scene.

Figure 2:
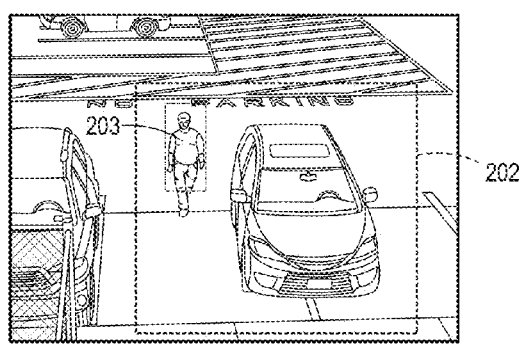
FIG. 2 illustrates a video frame including a Region of Interest (ROI), and a person track and timer according to an exemplary embodiment of this disclosure.

2) Detect Vehicle 50. This step determines the presence of a vehicle 112 to initiate vandalism detection processing. The activation of this service can be implemented by a vehicle user signing up or logging on to a mobile parking application through a smartphone or other platform prior to or after parking. An automatic method may be used to determine when a vehicle is present in a parking space. A region of interest, i.e., Vehicle_ROI 202, as shown in FIG. 2 is defined 114 around a vehicle using the parking space geometry and/or vehicle geometry. After a vehicle is determined to be in the parking spot, Vehicle Flag is set to 1 (true).

Figure 3:
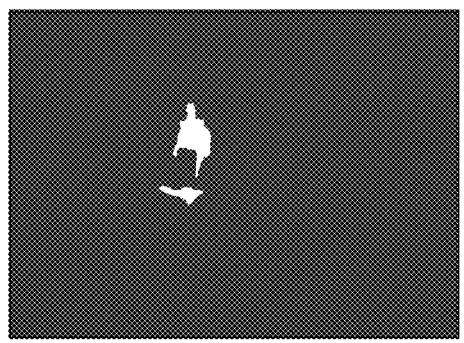
FIG. 3 illustrates the video frame of FIG. 2 processed to generate a foreground image from a Gaussian Mixed Model (GMM) according to an exemplary embodiment of this disclosure.
Figure 4:
FIG. 4 illustrates a probability space, i.e., pixels having a high correlation with the tracked object, for a mean-shift tracker.

3) Detect Person 40. After a vehicle is detected 112, i.e., Vehicle Flag==1, foreground/background objects are found 116 using either background subtraction, motion segmentation, or both. In the present embodiment described, a Gaussian Mixed Model (GMM) is used that models the background for each pixel as shown in FIG. 3, thus allowing a segmentation of background pixels (black) and foreground pixels (white). Clusters of foreground pixels shown as white blobs in FIG. 3 are analyzed to find characteristics matching that of a person object. After a person object is detected 118, such as person 203 shown in FIG. 2, a timer 106 is associated to the detected person and a Person Flag 120 is set to 1. At this time, a tracker is initialized that is able to track the detected person over time. According to this exemplary embodiment, mean-shift tracking is utilized as shown in FIG. 4 where FIG. 4 shows the probability space, i.e., pixels which have a high correlation with the tracked object for the mean-shift tracker. Note that this step is run for every frame, thus there may be multiple person objects, each with their own timer and track.

4) Detect Contact 30. For each detected person object, i.e., Person Flag==1 108, a distance is calculated between the person and the vehicle 122. For example, the closest distance between each detected person and a mid-line of the vehicle. Other distances that may be used include, but are not limited to, the distance between the detected person and a centroid of the vehicle, and a percentage of overlap between the detected person and the vehicle. If the closest point is within a threshold to the mid-line, then person-vehicle contact is detected 124. A variable Intersect_Count 126 is incremented each time a person-vehicle contact is detected and the location of the intersection is also collected, which is referred to as an intersection point.

5) Detect Loitering 20. Loitering can occur when a person attempts to vandalize or steal from a vehicle. For example, a person walking near a vehicle may look inside or walk around the vehicle. In either case, loitering can be defined as a person entering a proximity of a vehicle and remaining in this proximity over a fixed amount of time. According to the exemplary embodiment described, loitering 128 is defined to occur when Person Timer exceeds a pre-defined temporal threshold 106.

Figure 11:
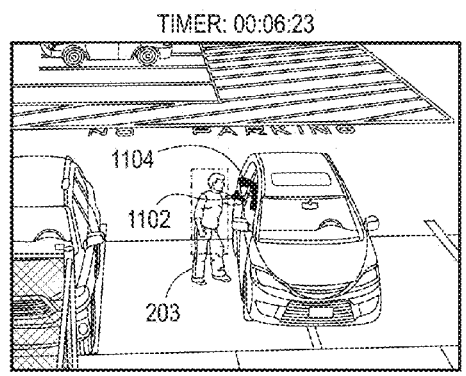
FIG. 11 is a seventh example of an output of an exemplary method and system for detecting vandalism and/or loitering according to this disclosure, the output representative of a detected "Vandalism" event.
Figure 12:
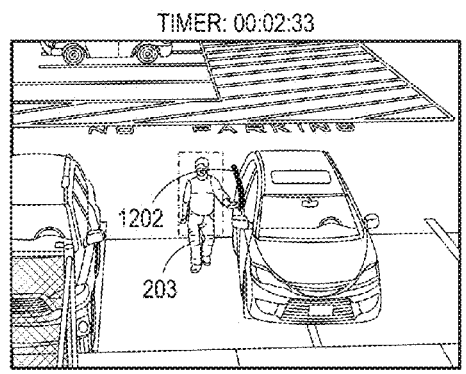
FIG. 12 is an eighth example of an output of an exemplary method and system for detecting vandalism and/or loitering according to this disclosure, the output representative of a detected "Vandalism" event.
Figure 13:
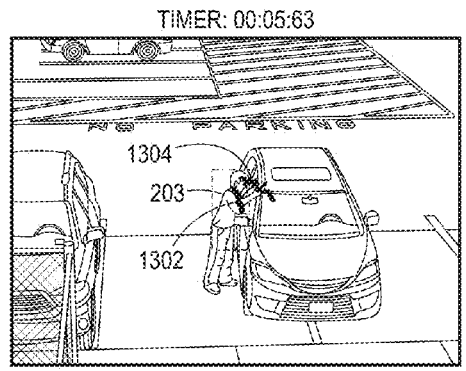
FIG. 13 is a ninth example of an output of an exemplary method and system for detecting vandalism and/or loitering according to this disclosure, the output representative of a detected "Vandalism" event.

6) Detect Vandalism 10. Vehicle vandalism occurs when a person deliberately causes damage or destruction to a vehicle. Some examples of this are a person "keying" a vehicle, i.e., scratching the vehicle surface with a key, breaking a window, slashing tires, or denting the exterior of the vehicle. In all of these cases, it usually involves a person making direct physical contact with his or her hands. According to this step, contact is detected by monitoring Intersect_Count 126. If Intersect_Count is greater than a pre-defined threshold 104, for example 20, a vandalism event is detected 130. By spatially and temporally analyzing where the intersections occurred, as shown in FIGS. 11-13, different types of vandalism, such as smashing a window or keying the vehicle can be automatically classified. For example, automatic approaches include the use of a Hough transform on the intersection points 1102, 1104, 1202, 1302 and 1304 shown in FIGS. 11-13 to determine lines along the sides of the vehicle indicating keying, or clustering, to determine regions which have been contacted. Foreground pixel change detection may also be used, where a known model of the vehicle is compared to a current representation after vandalism has occurred. A classifier may also be used to classify the intersection points with or without other features associated with the vehicle to determine when and what type of vandalism has occurred.

A method and system were implemented in MATLAB. To measure the performance of the algorithm, 15 videos were collected of a person performing several of these actions.

The dataset consisted of three main classes of events: walk by, loiter, and vandalize. During the walk by event, an individual walks near enough the vehicle to be within the Vehicle_ROI, but does not remain near the vehicle or physically contact the vehicle. During the loiter event, a person enters the Vehicle_ROI and remains there for more than a pre-defined threshold. The third class event, vandalize, occurs when an individual makes contact with a vehicle during several frames.

Figure 5:
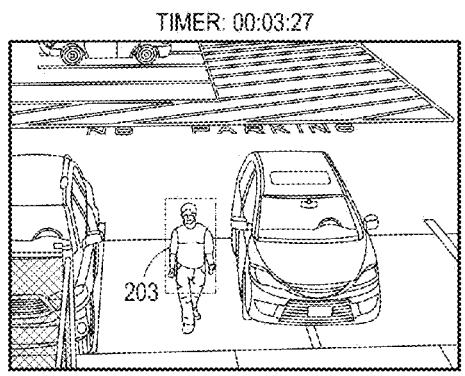
FIG. 5 is a first example of an output of an exemplary method and system for detecting vandalism and/or loitering according to this disclosure, the output representative of a detected "Walk By" event.

FIG. 5 is a first example of an output of an exemplary method and system for detecting vandalism and/or loitering according to this disclosure, the output representative of a detected "Walk By" event, where person 203 is detected to be within the Vehicle_ROI for 3.27 seconds without any vehicle contact.

Figure 6:
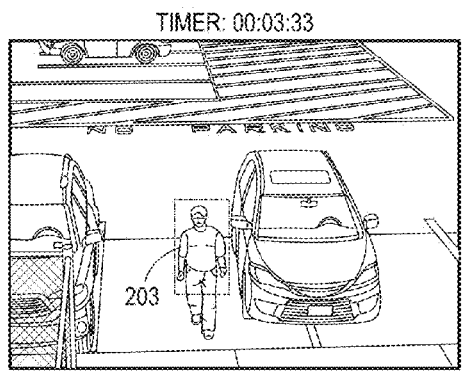
FIG. 6 is a second example of an output of an exemplary method and system for detecting vandalism and/or loitering according to this disclosure, the output representative of a detected "Walk By" event.

FIG. 6 is a second example of an output of an exemplary method and system for detecting vandalism and/or loitering according to this disclosure, the output representative of another detected "Walk By" event, where person 203 is detected to be within the Vehicle_ROI for 3.33 seconds without any vehicle contact.

Figure 7:
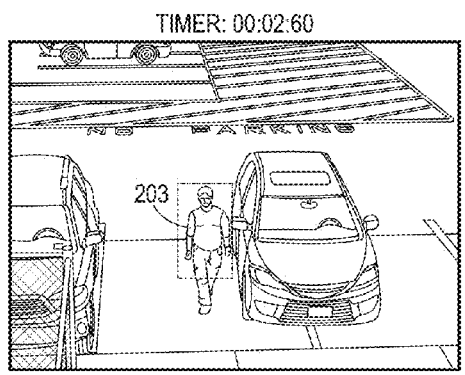
FIG. 7 is a third example of an output of an exemplary method and system for detecting vandalism and/or loitering according to this disclosure, the output representative of a detected "Walk By" event.

FIG. 7 is a third example of an output of an exemplary method and system for detecting vandalism and/or loitering according to this disclosure, the output representative of a detected a third "Walk By" event, where person 203 is detected to be within the Vehicle_ROI for 2.60 seconds without any vehicle contact.

Figure 8:
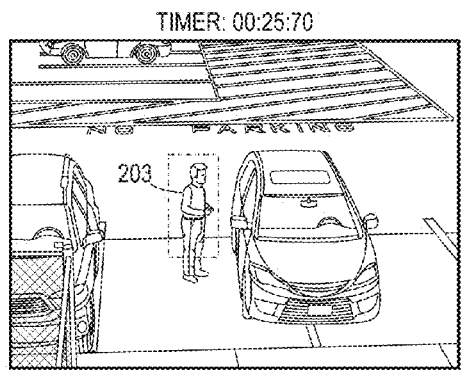
FIG. 8 is a fourth example of an output of an exemplary method and system for detecting vandalism and/or loitering according to this disclosure, the output representative of a detected "Loitering" event.

FIG. 8 is a fourth example of an output of an exemplary method and system for detecting vandalism and/or loitering according to this disclosure, the output representative of a detected "Loitering" event, where person 203 is detected to be within the Vehicle_ROI for 25.70 seconds, without any vehicle contact.

Figure 9:
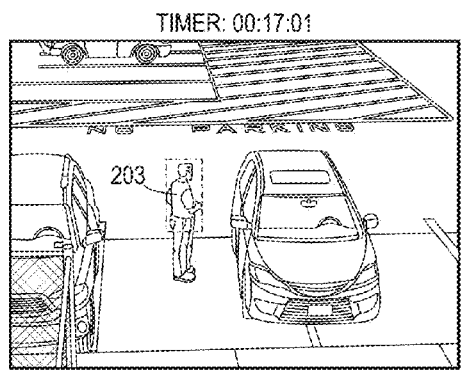
FIG. 9 is a fifth example of an output of an exemplary method and system for detecting vandalism and/or loitering according to this disclosure, the output representative of a detected "Loitering" event.

FIG. 9 is a fifth example of an output of an exemplary method and system for detecting vandalism and/or loitering according to this disclosure, the output representative of a detected "Loitering" event, where person 203 is detected to be within the Vehicle_ROI for 17.01 seconds, without any vehicle contact.

Figure 10:
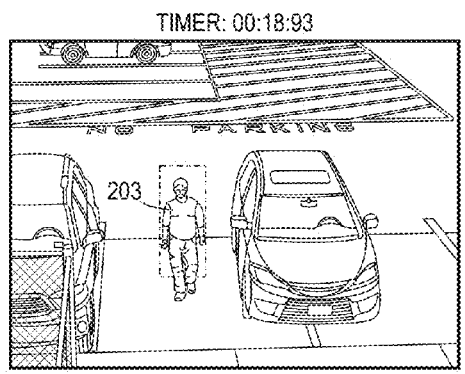
FIG. 10 is a sixth example of an output of an exemplary method and system for detecting vandalism and/or loitering according to this disclosure, the output representative of a detected "Loitering" event.

FIG. 10 is a sixth example of an output of an exemplary method and system for detecting vandalism and/or loitering according to this disclosure, the output representative of a detected "Loitering" event, where person 203 is detected to be within the Vehicle_ROI for 18.93 seconds, without any vehicle contact.

FIG. 11 is a seventh example of an output of an exemplary method and system for detecting vandalism and/or loitering according to this disclosure, the output representative of a detected "Vandalism" event.

FIG. 12 is an eighth example of an output of an exemplary method and system for detecting vandalism and/or loitering according to this disclosure, the output representative of a detected "Vandalism" event, where person 203 is detected to be in contact with the parked vehicle.

FIG. 13 is a ninth example of an output of an exemplary method and system for detecting vandalism and/or loitering according to this disclosure, the output representative of a detected "Vandalism" event, where person 203 is detected to be in contact with the parked vehicle.

Figure 14:
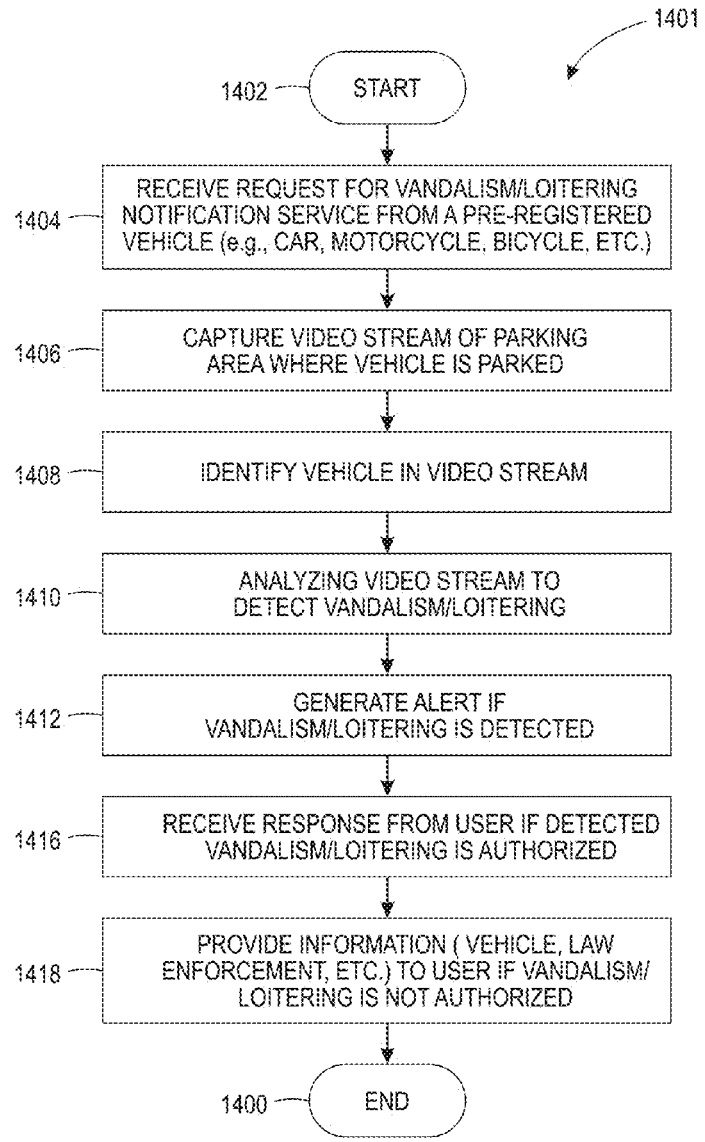
FIG. 14 is a flow chart of an exemplary embodiment of a method for detecting vandalism and/or loitering according to this disclosure.

FIG. 14 illustrates a high-level flow chart of operations depicting logical operational steps of a method 1401 for detecting vandalism/loitering, in accordance with an exemplary embodiment. As indicated at block 1402, the process is initiated. Thereafter, as shown at block 1404, a server, e.g., a vandalism/loitering notification server, receives a request for the service from a pre-registered vehicle user. The request can be generated from, e.g., a smartphone app. Next, as shown at block 1406, a step or logical operation is implemented for capturing a video stream of a parking area wherein a vehicle is parked, the video stream provided by cameras that are deployed on a street or lot for the video-based parking technology. Then, as depicted at block 1408, a step or logical operation is implemented for identifying the vehicle in the video stream. Next, as described at block 1410, a step or logical operation is implemented for analyzing the video stream to detect vandalism/loitering with respect to the identified vehicle. Thereafter, as shown at block 1412, a step or logical operation is implemented for generating an alert if vandalism and/or loitering is detected.

According to an exemplary embodiment, the alert is communicated to a user's/subscriber's mobile communication device. However, the alert may also be communicated to the user/subscriber via a computer program running on a desktop/laptop computer, e.g., popup window, and/or email and/or via a telephone call to a work/home phone, and/or other via other communication devices.

At block 1416, a step or logical operation is implemented for allowing a server, e.g., a vandalism/loitering detection server, to receive a user response to the alert indicating whether the user authorizes the detected vandalism/loitering. If the user's response does not provide authorization, the next step or logical operation, as depicted by block 1418, is to provide contact information of law enforcement agents together with other vehicle information that may help stop potential vandalism, theft, etc. The process terminates, as shown at block 1400.

The embodiments are described at least in part herein with reference to flowchart illustrations and/or block diagrams of methods, systems, and computer program products and data structures according to embodiments of this disclosure. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein such as, for example, the various instructions discussed and shown with respect to the figures herein, These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 15:
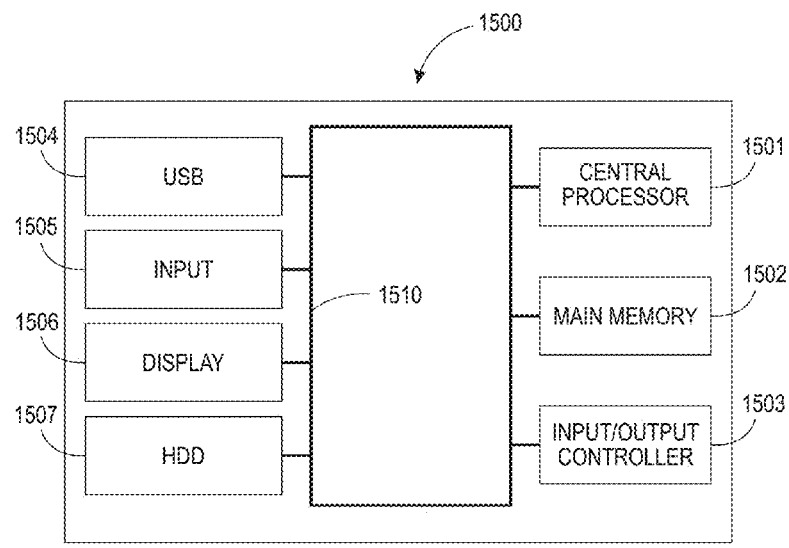
FIG. 15 is a block diagram of an exemplary embodiment of a system for detecting vandalism and/or loitering according to this disclosure.
Figure 16:
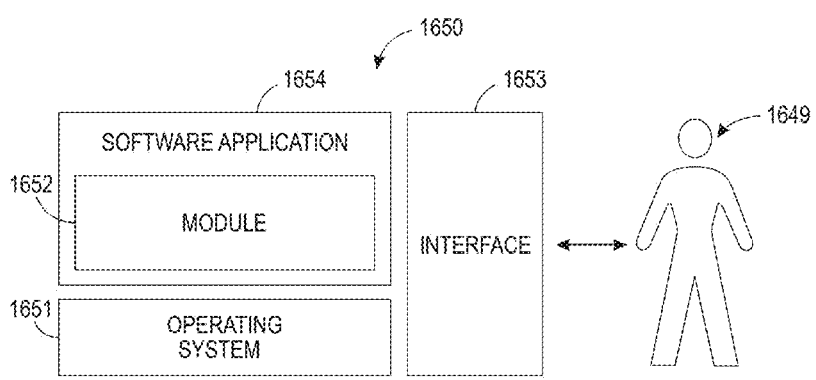
FIG. 16 is a block diagram of an exemplary software system for detecting vandalism and/or loitering according to this disclosure.

FIGS. 15 and 16 are provided as exemplary diagrams of data-processing environments in which embodiments of the present disclosure may be implemented. It should be appreciated that FIGS. 15 and 16 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments. Note that FIGS. 15 and 16 generally illustrate a data-processing system in which embodiments may be implemented (e.g., such as an "app"). FIGS. 15 and 16 are thus representative of a variety of different types of data-processing systems and devices including, for example, servers, laptop computers, Smartphones, "pad" or tablet computing devices, desktop computers, and other computing devices.

As illustrated in FIG. 15, the disclosed embodiments may be implemented in the context of a data-processing system 1500 that can include, for example, a central processor 1501, or other processors, a main memory 1502, a controller 1503, and in some embodiments, a USB (Universal Serial Bus) 1504 or other appropriate peripheral connection. System 1500 can also include an input device 1505, e.g., a keyboard, pointing device such as a mouse, etc., a display 1506, and a HDD (Hard Disk Drive) 1507, e.g., mass storage. As illustrated, the various components of data-processing system 1500 can communicate electronically through a system bus 1510 or similar architecture. The system bus 1510 may be, for example, a subsystem that transfers data between, for example, computer components within data-processing system 1500 or to and from other data-processing devices, components, computers, etc.

FIG. 16 illustrates a computer software system 1650, which may be employed for directing the operation of the data-processing system 1500 depicted in FIG. 15. Software application 1654, stored in memory 1502 and/or on HDD 1507, generally can include and/or can be associated with a kernel or operating system 1651 and a shell or interface 1653. One or more application programs, such as module(s) 1652, may be "loaded", i.e., transferred from mass storage or HDD 1507 into the main memory 1502, for execution by the data-processing system 1500. In the example shown in FIG. 16, module 1652 can be implemented as, for example, a software module that performs the logical instructions or operations as described herein.

The data-processing system 1500 can receive user commands and data through user interface 1653 accessible by a user 1649. These inputs may then be acted upon by the data-processing system 1500 in accordance with instructions from operating system 1651 and/or software application 1654 and any software module(s) 1652 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules, e.g., module 1652, can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 1653, e.g., a graphical user interface, can serve to display results, whereupon a user may supply additional inputs or terminate a particular session. In some embodiments, operating system 1651 and interface 1653 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 1651 and interface 1653.

FIGS. 15 and 16 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 17:
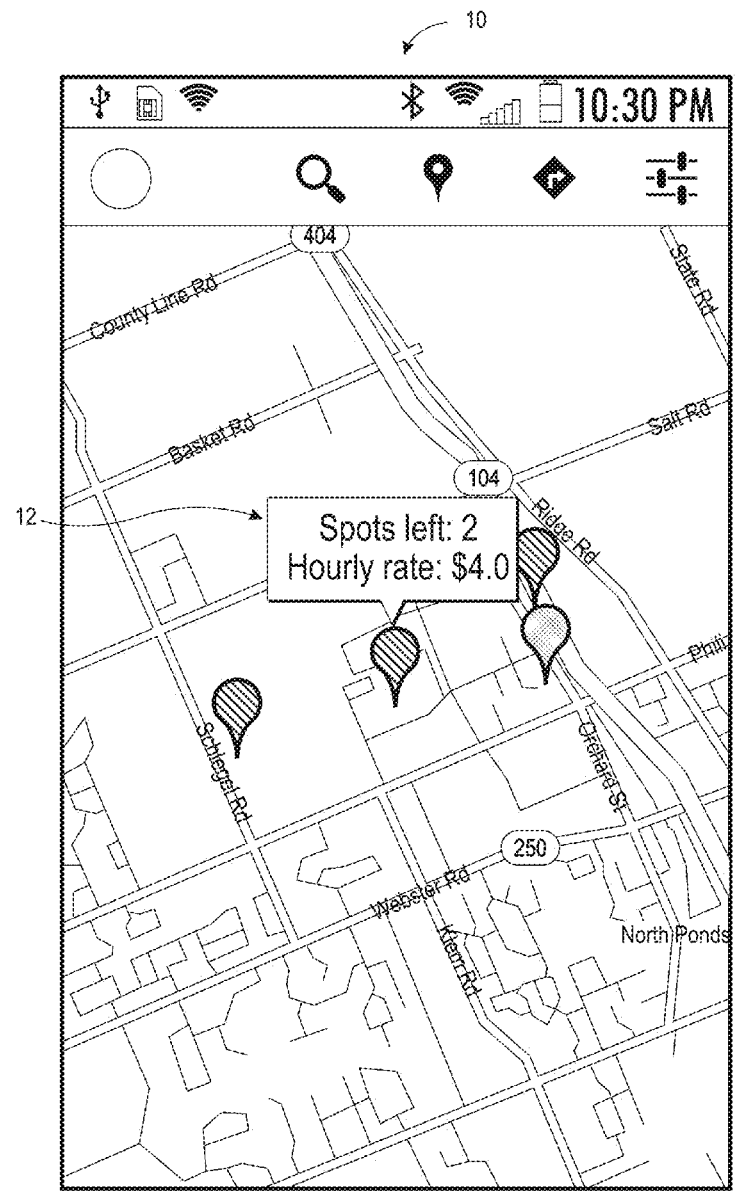
FIG. 17 illustrates a screenshot of an example parking "app" that can be implemented via a Smartphone or other computing device, in accordance with a preferred embodiment.

FIG. 17 illustrates a screenshot of an example parking "app" that can be implemented via a Smartphone or other computing device 10, in accordance with an exemplary embodiment. The parking "app" can be part of an offering of a vandalism/loitering notification service. The "app" itself functions to find an available parking spot, to find an available parking spot with available vandalism/loitering notification service, and to notify a user of potential vandalism and/or loitering related to his or her vehicle, as is explained in greater detail herein. As shown in FIG. 17, a Smartphone 10 displays a GUI (Graphical User Interface) that can include, for example, graphically displayed maps and directions and in some situations, turn-by-turn directions to a particular destination 12 along with, for example, 20 satellite and 3D earth views; along with, in some instances, photographic views of the turns, which show the real streets and surroundings. The data displayed via such a GUI can be derived from, for example, satellite mapping information and other geographical data. Note that, as utilized herein, the term "app" is an abbreviation for "application". An app is thus a piece of software. It can run on the Internet, on a computer, or on a mobile computing device or other electronic device.

Figure 18:
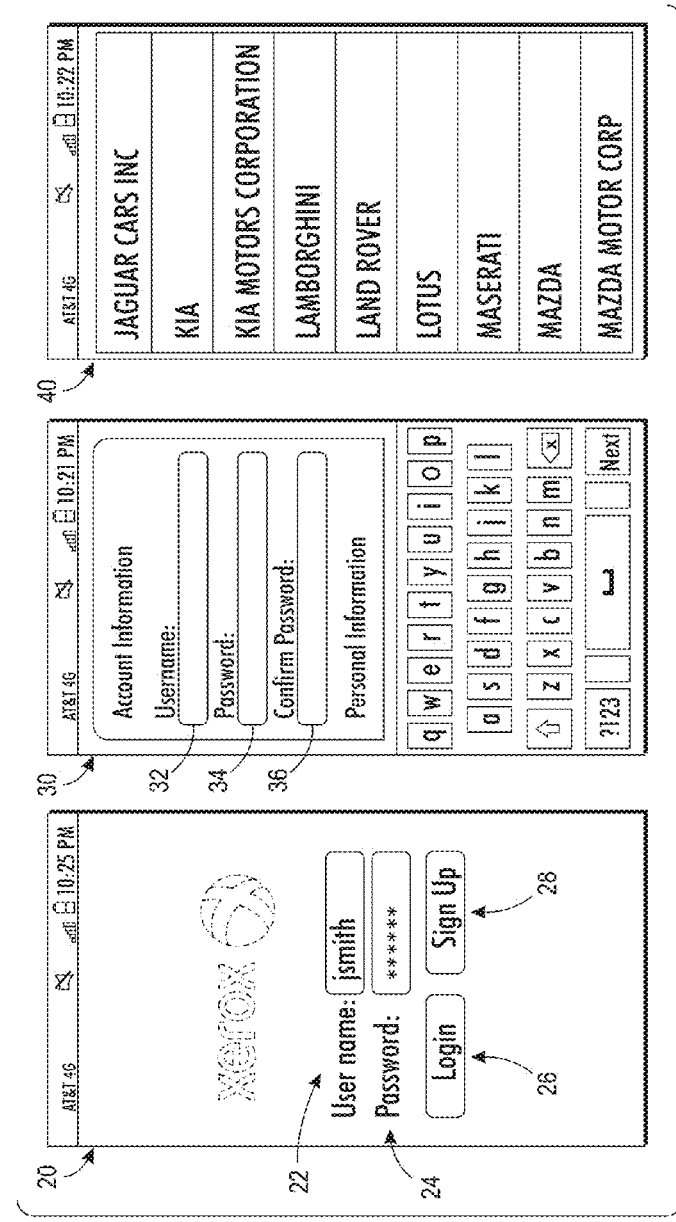
FIG. 18 illustrates screenshots of three respective GUI displays, which are also displayable via a Smartphone such as shown in FIG. 17, in accordance with a preferred embodiment.

FIG. 18 illustrates screenshots of three respective GUI displays 20, 30, and 40, which are also displayable via a Smartphone such as shown in FIG. 17, in accordance with a preferred embodiment. FIG. 18 thus demonstrates how a user can register his/her vehicle by inputting his/her vehicle's information. Thus, for example, GUI 20 includes an input field 22 for entering a user name and an input field 24 for entering a password to access the parking app. Graphically displayed login button 26 and sign-up button 28 are also displayable via the GUI 20. To the right of GUI 20 is shown a subsequent GUI 30 that allows a user to enter additional account information into fields 32, 34, 36 after logging into the app via, for example, the login button 26. GUI 40 allows for the selection and/or identification of a number of different types of vehicle types (e.g., KIA, JAGUAR, etc.). Additional vehicle information (e.g., vehicle's color and model) can also be included in the registration process.

Figure 19:
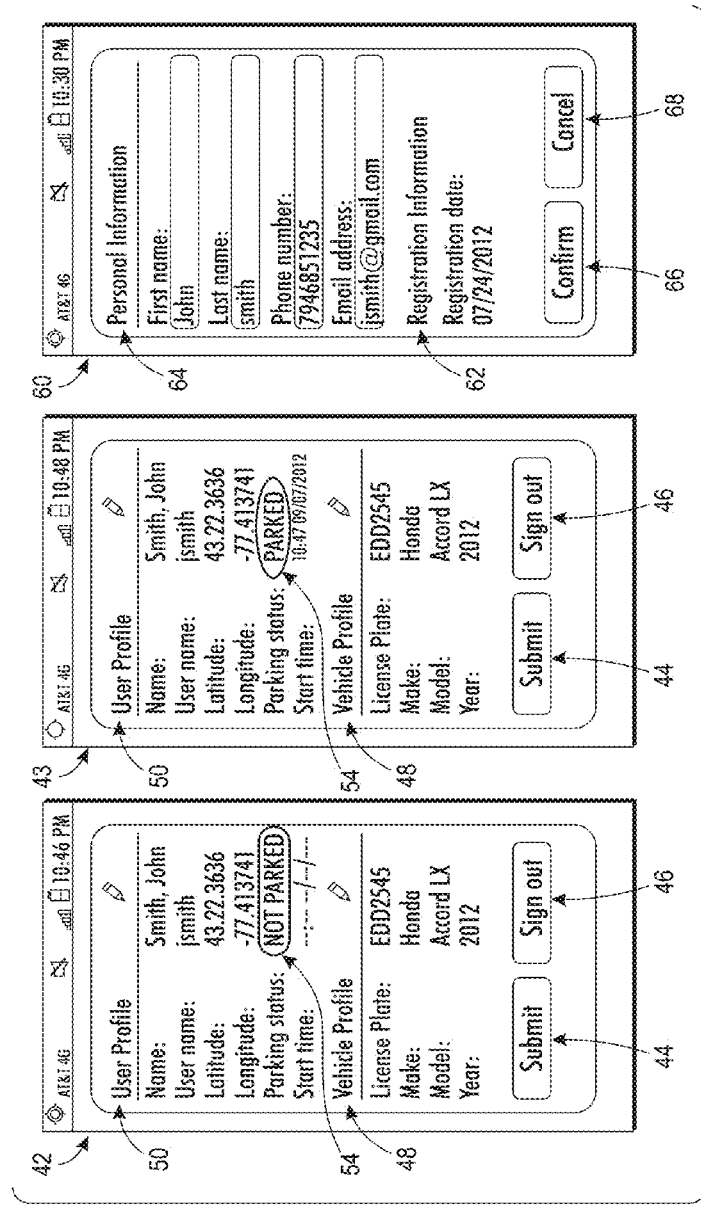
FIG. 19 illustrates additional GUI's displaying different user options, in accordance with a preferred embodiment.

FIG. 19 illustrates additional GUI's 42, 43, and 60 displaying different user options, in accordance with a preferred embodiment GUI 42, for example, offers a section 50 that displays user profile information including, for example, a parking status field 54 that displays parking information such as, for example, "NOT PARKED." A section 48 can display vehicle profile information, which may be entered and altered by the user. Submission of this information can occur via, for example, a submit button 44. The user can sign out via sign out button 46. GUI 43 displays information and options similar to that shown in GUI 42. In the example of GUI 43, the status identifier 54 indicates "PARKED" as opposed to "NOT PARKED" shown in GUI 42. GUI 60 permits a user to enter and/or view personal information 64 and registration information 62. Buttons 66 and 68 respectively allow a user to confirm or cancel the entry or viewing of such information.

A variety of steps can be implemented for the vehicle monitoring technique discussed herein. Although the methodology disclosed herein generally relates to applications implemented via a Smartphone, it can be appreciated that they are also capable of being implemented via other computing devices such as desktop personal computers, laptop computers, "pad" computing devices (e.g., Android, Apple, etc.), as well as vehicle on-board wireless communication devices.

Thus, a user can sign up or login to the mobile parking application through a smartphone or other platform prior to parking as shown in FIG. 18 (e.g., see the login button 26 and the sign up button 28). Information can be provided to the user to guide the user to parking locations where parking is available and video security is an option. FIG. 17, for example, shows the mobile parking space finding application that can guide users to the appropriate parking spot. The safety and cost statistics for vandalism/loitering can also be presented to reinforce the value of the option to the user. Information will be provided stating whether security is an option the client pays for or included automatically as part of the parking service and fees.

At the sign up step, the user's information, such as vehicle type, vehicle color, license plate number, or the parking account number (if the user already has an account), etc., can be entered or retrieved from memory and populated in the application automatically. Many services paid or free are provided after login. Security monitoring is one such service.

Either before or after parking, the user is prompted to answer if he/she would like to have the vehicle vandalism and loitering monitoring and prevention service added to their parking spot If the user clicks "yes", a unique 10 code (such as the vehicle's license plate number or the parking account number) is created by the mobile parking application and sent to the server to register the vehicle and the services desired.

The service can be initiated when the vehicle is parked in an appropriate location. The server with vehicle detection video analytics associates the code with the parking vehicle. Typically, the vehicle's GPS location and starting parking time are enough to distinguish the vehicle from its neighboring parked vehicles. Occasionally, when two vehicles come to park at about the same time and parked near each other, other information such as the vehicle's color and size will be used for this association. If the vehicle's license plate number is provided in the sign up step, and the video analytics is capable of detecting and recognizing license plate number (see U.S. patent application Ser. No. 13/888, 528, filed May 7, 2013, by Zehler et al., entitled "SYSTEM AND METHOD OF MAPPING MULTIPLE APPLICATIONS TO A SINGLE NFC TAG"), this association will be even easier.

After parking, the user is asked to confirm the "start of security" monitoring of the vehicle and, optionally, some confirming picture or info is presented to the user to confirm their vehicle is the proper one. During the length of the parking session the video feeds, which include the vehicle with the security option selected 1, are recorded for review, if needed, and segmented and processed by video analytics including the vandalism/loitering detection software.

Several actions can be configured to occur if a vandalism/ loitering event is detected. For example, police contact information can be attached to the alarm so that the user can directly contact the police. Recorded videos are also available for police to review. In case of a false alarm, the user can "click" away the alarm to let the server know. The system can attempt several different mechanisms to contact the owner of the vehicle or item under secure observation in order to be robust vs. forgetting to turn off the security feature. After repeated alarms sent to the user without response, the server can initiate a call to police providing the location and vehicle information (maker, model, color, license plate number, etc.) and a copy of the relevant video if desired by local police enforcement.

When ending the parking session and the vandalism/loitering detection service, the user can click a button from his/her smartphone to let the server know the end of the parking session. The server will de-activate the created vandalism and loitering monitoring code and turn off the service. To prevent the user accidentally hitting the button, the de-activation may only be done when the smartphone is near the vehicle's location or an "are you sure" check before turning off the service is required.

This service can be provided either based on the parking time monitored or each parking session. It may also have tiers of services based on machine monitoring, human monitoring, and the aggressiveness of the actions taken in response to a detected event.

While the focus of the disclosed embodiments are generally for automobile parking vandalism and loitering monitoring, the term "vehicle" as utilized herein can refer to a variety of vehicles such as automobiles, trucks, bicycles, motorcycles, etc.

The disclosed embodiments can be implemented in, for example, a smartphone parking application with real time parking availability data inputting from cameras. Parking space finding and reservation, as well as automatic parking bill payment, are some of the functions that can be incorporated into the "app". Security applications can be added on top of these functions.

FIG. 19 illustrates how a registered user can park his/her vehicle and then get billed later with exact parking time. When the user parks his/her vehicle, he/she is required to initiate a parking session by logging into the application and pressing the submit button. In doing so, his/her account information, time stamp, as well as the GPS coordinates are transmitted to the central server. If the user signed up for the vehicle vandalism/loitering detection service, the code created as described above can be sent together with all the other information shown.

Figure 20:
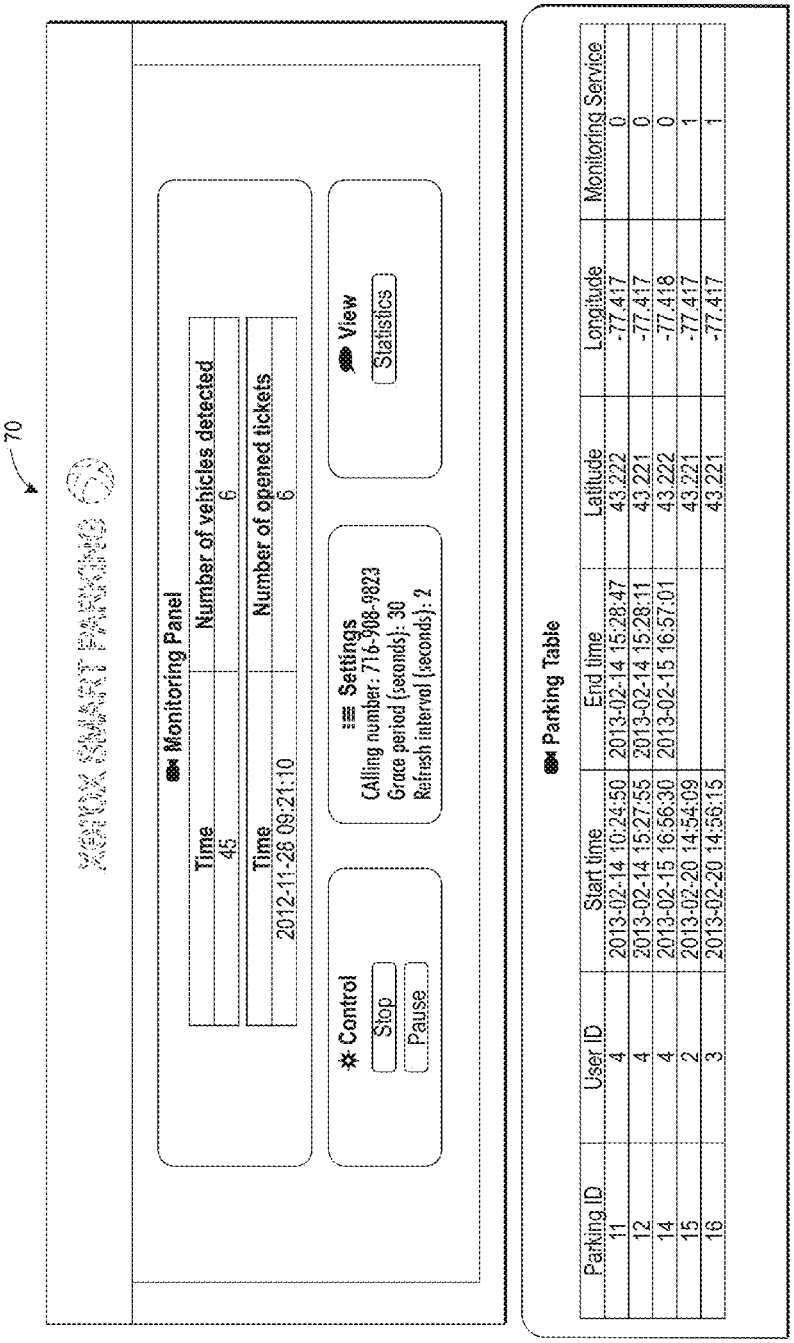
FIG. 20 illustrates example GUIs, which can be implemented with respect to the server side that takes the vehicle occupancy data from video detection data and compares it with the current occupancy data including the vehicles signed up with the vandalism and loitering detection service, in accordance with embodiment.

FIG. 20 illustrates example GUIs 70 and 72 which can be implemented with respect to the server side that takes the vehicle occupancy data from video detection data and compares it with the current occupancy data including the vehicles signed up with the vandalism/loitering detection service, in accordance with this embodiment. GUI's 70 and 72 illustrates a prototype of a web-based monitoring tool. The value "0" shown in the parking table of GUI 72 indicates that the vehicle does not have the vandalism/loitering detection service and "1" means the service is enabled (e.g., see the column labeled "Monitoring Service" in the parking table displayed via GUI 72).

Figure 21:
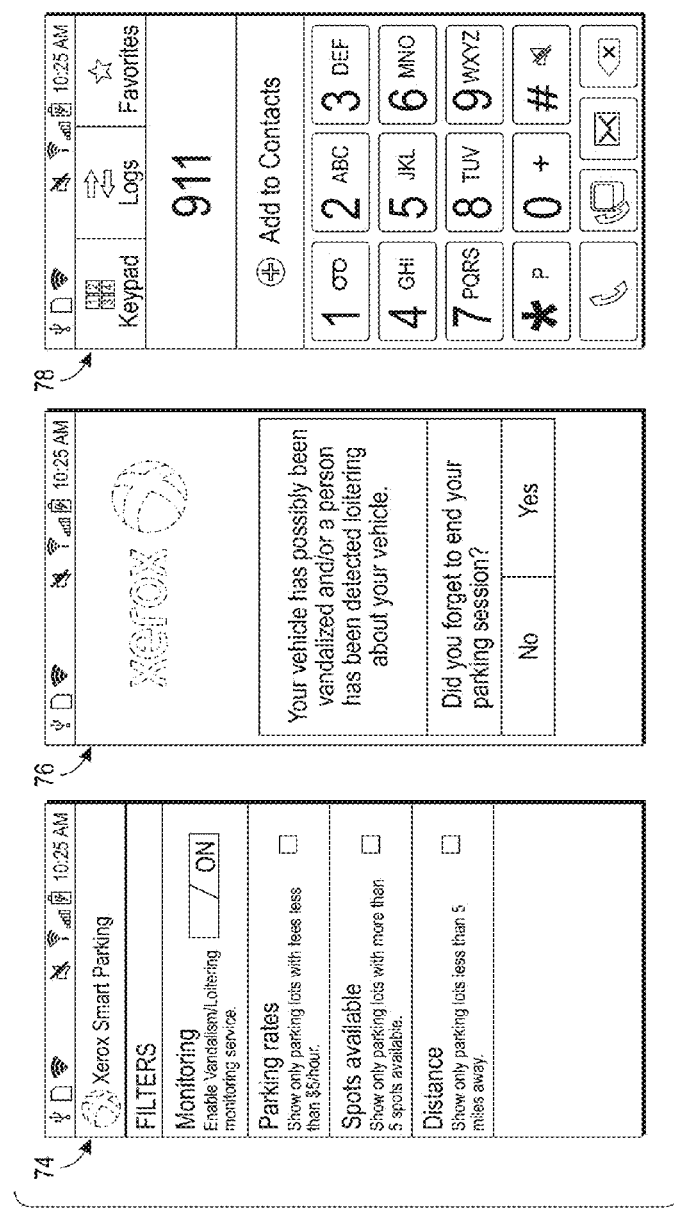
FIG. 21 illustrates example "app" GUI's, which can be implemented in accordance with an alternative embodiment.

FIG. 21 illustrates Smartphone app GUI's 74, 76, and 78, which can be implemented in accordance with an alternative embodiment. GUI 74 provides a filter for the vandalism/loitering monitoring service. When the filter in "on", the user enabled the vandalism/loitering detection and notification service. The user could select "off" even if he/she already registered with the vandalism/loitering detection/notification service. GUI 76 indicates that when the vehicle is detected to have left the parking spot without the user deactivating the service, a notification can be sent to the user (e.g., "Your vehicle has been moved" and "Did you forget to end your parking session?"). If the user selects "No", a dial pad can be presented to the user as shown via GUI 78 so that the user can conveniently call the police or an appropriate emergency service.

Based on the foregoing, it can be appreciated that a number of embodiments, preferred and alternative, are disclosed herein. For example, in one embodiment, a method for detection of vehicle vandalism/loitering can be implemented. Such a method can include the steps or logical operations of capturing a video stream of a parking area wherein a vehicle is parked, the video stream provided by a vandalism/loitering detection service to which the vehicle is pre-registered; identifying the vehicle in the video stream, analyzing the video stream to detect any vandalism/loitering motion with respect to the vehicle, and generating an alert if the vandalism/loitering is detected. Such a vehicle can be, for example, an automobile, motorcycle, a motorized scooter, bicycle, etc.

In another embodiment, a step or logical operation can be provided for registering the vehicle with a vandalism/loitering detection service via a computing device. In yet another embodiment, a step or logical operation can be provided for identifying the vehicle in the video stream using information provided by the registering of the vehicle with the vandalism/loitering notification service. In still another embodiment, a step or logical operation can be provided for transmitting the alert regarding the motion to a mobile communications device of a user associated with the vehicle.

In another embodiment, a step or logical operation can be provided for transmitting back a response from the user regarding the alert to indicate whether the user authorized the loitering and/or contact with the vehicle. In yet another embodiment, a step or logical operation can be provided for providing a link to a webpage associated with the vandalism/loitering notification service, wherein the webpage displays interactive data for verification, enforcement, and prosecution use by civil authorities.

Based on the foregoing, it can be appreciated that a number of embodiments, preferred and alternative, are disclosed herein. For example, in one embodiment, a method for preventing vehicle vandalism and/or loitering can be implemented. Such a method can include the steps or logical operations of capturing a video stream of a parking area wherein a vehicle is parked, the video stream provided by a vehicle monitoring service to which the vehicle is pre-registered; identifying the vehicle in the video stream, analyzing the video stream to detect potential vandalism and/or loitering with respect to the vehicle, and generating an alert if vandalism and/or loitering is detected. Such a vehicle can be, for example, an automobile, motorcycle, a motorized scooter, bicycle, etc.

Various additional information, such as definitions, related to this disclosure and the exemplary embodiments described herein is provided below.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of detecting a predefined human activity in a region of interest (ROI) associated with a parked vehicle registered with a vehicle monitoring service, the method comprising:
   the vehicle monitoring service capturing a video stream of a parking area including the parked vehicle registered with the vehicle monitoring service;
   the vehicle monitoring service identifying the parked vehicle in the video stream;
   the vehicle monitoring service processing the video to detect the predefined human activity with respect to the ROI associated with the parked vehicle registered with the vehicle monitoring service, the predefined human activity including a person detected within the ROI and behaving in a predefined manner associated with vandalism and vandalism is detected by the vehicle monitoring service performing a method comprising:
      detecting the parked vehicle
      defining the ROI to include a region surrounding the detected parked vehicle
      detecting a person within the ROI; and
      determining the person tracked within the ROI has contacted the parked vehicle if an image representation of the person tracked intersects with an image representation of the parked vehicle by a threshold; and
   the vehicle monitoring service communicating an alert to a user associated with the parked vehicle if the predefined human activity is detected.

2. The method of detecting a predefined human activity according to claim 1, wherein the parked vehicle is one of an automobile, motorcycle, motorized scooter, truck, van, golf-cart, ATV, and a bicycle.

3. The method of detecting a predefined human activity according to claim 1, wherein the parked vehicle is pre-registered with the vehicle monitoring service.

4. The method of detecting a predefined human activity according to claim 3, wherein the parked vehicle is registered using one of a computing device, a phone, and verbally communicating with an operator of the parking area.

5. The method of detecting a predefined human activity according to claim 4, further comprising:
   the user transmitting a response to the vehicle monitoring service indicating if the detected human activity is authorized by the user.

6. The method of detecting a predefined human activity according to claim 1, wherein the predefined human activity is associated with one or more of loitering, vandalism, vehicle trespass, theft of an article from the vehicle and lying in wait.

7. The computer-implemented method of detecting a predefined human activity according to claim 1, wherein the predefined human activity is associated with loitering and loitering is detected by the vehicle monitoring service performing a method comprising:
   detecting the parked vehicle;
   defining the ROI to include a region surrounding the detected parked vehicle;

detecting a person within the ROI and initializing a timer; and determining the detected person is loitering if the timer exceeds a temporal threshold.

8. A system for detecting a predefined human activity in a region of interest (ROI) associated with a parked vehicle pre-registered with a vehicle monitoring service comprising:
a detection device including memory which stores instructions for performing the method of claim 1 and a processor in communication with the memory for executing instructions.

9. A parked vehicle monitoring system for detecting a predefined human activity in a region of interest (ROI) associated with a parked vehicle registered with the vehicle monitoring system;
one or more image capturing devices configured to capture a video stream of a parking area including the parked vehicle registered with the vehicle monitoring system;
an image processing module configured to process the video to detect the predefined human activity with respect to the ROI associated with the parked vehicle registered with the vehicle monitoring system, the predefined human activity including a person detected within the ROI and behaving in a predetermined manner associated with vandalism and vandalism is detected by the vehicle monitoring service performing a method comprising:
detecting the parked vehicle;
defining the ROI to include a region surrounding the detected parked vehicle;
detecting a person within the ROI;
tracking the person detected within the ROI; and
determining the person tracked within the ROI has contacted the parked vehicle if an image representation of the person tracked intersects with an image representation of the parked vehicle by a threshold; and
a communications module configured to communicate an alert to a user associated with the parked vehicle.

10. The parked vehicle monitoring system according to claim 9, wherein the vehicle is one of an automobile, motorcycle, motorized scooter, truck, van, golf cart, ATV, and a bicycle.

11. The parked vehicle monitoring system according to claim 9, wherein the parked vehicle is pre-registered with the vehicle monitoring system.

12. The parked vehicle monitoring system according to claim 9, wherein the parked vehicle is registered using one of a computing device, a phone, and verbally communicating with an operator of the parking area.

13. The parked vehicle monitoring system according to claim 9, further comprising:
the user transmitting a response to the vehicle monitoring system indicating if the detected human activity is authorized by the user.

14. The parked vehicle monitoring system according to claim 9, wherein the predefined human activity is associated with one or more of loitering, vandalism, vehicle trespass, theft of an article from the vehicle and lying in wait.

15. The parked vehicle monitoring system according to claim 9, wherein the predefined human activity is associated with loitering and loitering is detected by the vehicle monitoring service performing a method comprising:
detecting the parked vehicle;
defining the ROI to include a region surrounding the detected parked vehicle;

detecting a person within the ROI and initializing a timer; and determining the detected person is loitering if the timer exceeds a temporal threshold.

16. A computer-implemented method of detecting a predefined human activity in a region of interest (ROI) associated with a parked vehicle registered with a vehicle monitoring service, the method comprising:
the vehicle monitoring service capturing a video stream of a parking area including the parked vehicle registered with the vehicle monitoring service;
the vehicle monitoring service identifying the parked vehicle in the video stream;
the vehicle monitoring service processing the video to detect the predefined human activity with respect to the region of interest (ROI) associated with the parked vehicle registered with the vehicle monitoring service, the predefined human activity including a person detected within the ROI and behaving in a predefined manner associated with vandalism and vandalism is detected by the vehicle monitoring service performing a method comprising:
detecting the parked vehicle;
defining the ROI to include a pixel region surrounding the detected parked vehicle;
detecting a person within the ROI
tracking one or more pixel positions of the person detected within the ROI; and
determining the person tracked with the ROI has contacted the parked vehicle if one or more pixel representations of the person are closer than a threshold distance from a reference line associated with the parked vehicle; and
the vehicle monitoring service communicating an alert to a user associated with the parked vehicle if the predefined human activity is detected.

17. A parked vehicle monitoring system for detecting a predefined human activity in a region of interest (ROI) associated with a parked vehicle registered with the vehicle monitoring system;
one or more image capturing devices configured to capture a video stream of a parking area including the parked vehicle registered with the vehicle monitoring system;
an image processing module configured to process the video to detect the predefined human activity with respect to the ROI associated with the parked vehicle registered with the vehicle monitoring system, the predefined human activity including a person detected within the ROI and behaving in a predetermined manner associated with vandalism and vandalism is detected by the vehicle monitoring service performing a method of comprising:
detecting the parked vehicle;
defining the ROI to include a pixel region surrounding the detected parked vehicle;
detecting a person within the ROI;
tracking one or more pixel positions of the person detected within the ROI; and
determining the person tracked with the ROI has contacted the parked vehicle if one or more pixel representations of the person are closer than a threshold distance from a reference line associated with the parked vehicle; and a communications module configured to communicate an alert to a user associated with the parked vehicle.

\* \* \* \* \*